United States Patent [19]

Balloni et al.

[11] Patent Number: 4,590,125

[45] Date of Patent: May 20, 1986

[54] HEAT-SEALABLE MULTI-LAYER FILM STRUCTURES AND METHODS OF FORMING THE SAME

[75] Inventors: Riccardo Balloni, Fairport; Jay Keung, Macedon, both of N.Y.

[73] Assignee: Mobil Oil Corporation, New York, N.Y.

[21] Appl. No.: 694,541

[22] Filed: Jan. 24, 1985

[51] Int. Cl.$^4$ .............................................. B32B 27/00
[52] U.S. Cl. .................................... 428/349; 428/35; 428/347; 428/516; 428/910
[58] Field of Search ................. 428/349, 516, 35, 910, 428/347; 525/240; 156/244.11, 244.24; 264/176 R, 165

[56] References Cited

U.S. PATENT DOCUMENTS

| | | |
|---|---|---|
| 3,176,021 | 3/1965 | Volungis et al. |
| 3,399,156 | 8/1968 | Bell |
| 4,020,228 | 4/1977 | Eastes ................................... 428/516 |
| 4,032,493 | 6/1977 | Pascual ................................. 525/232 |
| 4,303,708 | 12/1981 | Gebhardt et al. .................... 428/349 |
| 4,327,147 | 4/1982 | Ou-Yang ........................... 428/319.9 |
| 4,414,261 | 11/1983 | Nanbu ................................... 428/516 |
| 4,419,408 | 12/1983 | Schmukler et al. ................. 428/516 |
| 4,419,410 | 12/1983 | Weiner |
| 4,419,411 | 12/1983 | Park |
| 4,436,788 | 3/1984 | Cooper ................................. 428/516 |

*Primary Examiner*—Edith Buffalow
*Attorney, Agent, or Firm*—Alexander J. McKillop; Michael G. Gilman; Charles J. Speciale

[57] ABSTRACT

Multi-layer structures, such as films of low coefficient of friction also having antistick characteristics over a wide temperature range during heat-sealing are disclosed. In accordance with a preferred embodiment, the films comprise an amide-containing polypropylene base layer and two heat sealable skin layers of a low stereoregularity polyolefin and microcrystalline wax. Methods for forming such structures are also disclosed.

16 Claims, No Drawings

HEAT-SEALABLE MULTI-LAYER FILM STRUCTURES AND METHODS OF FORMING THE SAME

This invention relates to multi-layer heat-sealable structures having exceptionally low film to film coefficients of friction over a wide temperature range and which, when used to wrap packages secured by a heat-seal layer or layers, avoids pack drag. This invention is also directed to multi-layer film structures having improved aesthetic appearance together with improved roll conformation and the avoidance of corrugation of finished goods in mill roll form. All of the foregoing improvements are secured without adversely affecting the high speed packaging performance of the films.

BACKGROUND OF THE INVENTION

Highly crystalline polypropylene film is an excellent packaging material, but it has high film to film coefficient of friction which makes it difficult to utilize in automatic packaging equipment. Certain innovations have improved on the surface friction characteristics of highly crystalline polypropylene in film form. For example, in U.S. Pat. No. 3,176,021, incorporated herein by reference, it is taught to include minor quantities of fatty acid amides into the polypropylene. In order to obtain the benefits taught by this patent, however, certain limitations must be observed. The film must be formed from a melt and extruded at a temperature between about 400°–550° F. In addition, the amide must be present in amounts of from 0.005 to about 2.0 weight percent of the polypropylene and it must be present along with from about 0.1 to about 4.0 weight percent polyethylene. Under these conditions and limitations the resulting polypropylene film has static coefficients of friction which are significantly higher than present day requirements. In addition, such a film does not have the high stereoregularity required by present day packaging demands. Further, it has been found that once such films have been subjected to the high temperatures which are experienced in practice such as during heat sealing, i.e., approaching 270° F., the coefficient of friction increases significantly and is nowhere near the present day requirements of about 0.25.

In U.S. Pat. No. 3,399,156, incorporated herein by reference, it is taught that the inclusion of the combination of silicone oil and finely divided silica into a polypropylene film produces a film which has a coefficient of friction of from 0.45 to 0.46 and is suitable for use in bread-wrapping machines. This is not a low enough co-efficient of friction for use in present day, high speed automatic packaging machinery, however.

It has been found that to a certain extent high crystallinity in polypropylene impedes facile migration of additives to the surface of such a polymer in film form. This problem has been addressed in U.S. Pat. No. 4,419,410, incorporated herein by reference. This publication teaches that by the coextrusion of a skin layer of polypropylene of comparatively low stereoregularity with a core layer of polypropylene of comparatively high stereoregularity, containing a surface modifying agent such as an amide of a fatty acid, the amide will bloom to the surface of the layer having the comparatively low stereoregularity polymer with comparative ease.

U.S. Pat. No. 4,419,411, incorporated herein by reference in its entirety, significantly advanced the art of making multi-layer polypropylene films suitable for most high speed packaging operations. This patent discloses a multi-layer polypropylene film structure having surface modifying agents comprising finely divided silica, silicone oil and an amide of a water insoluble mono-carboxylic acid having from about 8 to about 24 carbon atoms on a surface thereof. It is an object of the present invention to provide multi-layer film structures having surface layers with extremely low coefficients of friction over a wide temperature range.

It is a further object to provide such films having a reduced tendency for the film surfaces to stick together when used in high speed packaging machinery, especially at locations where heat sealing has occurred.

It is another object to improve the aesthetic features of multi-layer films by improving uniformity and avoiding levels of additives which cause haze.

Yet another object is to secure improvements in the handling characteristics of films in accordance with the invention, to improve roll conformance and avoid film corrugation.

It is another object to provide a process for preparing multi-layer film structures in accordance with the invention.

These and other objects will be apparent from a review of the instant specification.

SUMMARY OF THE INVENTION

The objects of the instant invention have been achieved by providing multi-layer film structures comprising a base layer comprising polypropylene of comparatively high stereoregularity a first heat sealable skin layer on the base layer comprising a first polyolefin of comparatively low stereoregularity, and from about 5% to about 15% by weight of the layer of microcrystalline wax and a second heat sealable layer on the base layer comprising second polyolefin of comparatively low stereoregularity, and from about 5% to about 15% by weight of the layer of microcrystalline wax. Each sealable layer preferably comprises finely-divided antiblocking agent as well. The laminar film structure includes an amount of fatty acid amide sufficient to provide said structure with coefficient of friction properties sufficient for high speed heat sealing packaging operations but insufficient to cause substantial hazing of the film. The films are preferably capable of being heat sealed via either surface. Thus, each sealable layer is preferably sealable to itself and to the other sealable layer.

The invention is also directed to methods for preparing films by coextruding from a melt a laminar combination of base and heat sealable layers as described above. Preferably, the coextruded material is oriented by stretching either uni- or bi-axially or preferably, both.

The present invention is directed to the improvement of the characteristics of a multi-layer film structure, the base layer of which is highly crystalline or highly stereoregular polypropylene in film form, preferably oriented film form. The preferred polypropylenes are well known in the art and are formed by polymerizing propylene in the presence of stereospecific catalyst systems. They can have a melt flow rate at 446° F. ranging from about 1 to about 25, preferably 1.5 to 8 and even more preferably from about 2 to about 4. The crystalline melting point is about 321°–325° F. The number average molecular weight ranges from about 25,000 to about 100,000, while the density ranges from about 0.90 to 0.91.

The amide which provides good slip properties to the structure is preferably an amide of a water-insoluble monocarboxylic acid having about 8 to about 24 carbon atoms or mixtures of said amides. Specific, preferred, examples of this class of amides are erucamide, oleamide, stearamide, behenamide, etc. While the amount of amide is best defined by the result to be accomplished, it is preferred that this additive be included in the film structure in an amount of about 0.02% to about 0.20% by weight and even more preferred in amounts between about 0.075 and about 0.10% by weight. It is to be understood that the amide may preferably be provided in the comparatively low stereoregular copolymer by dispersing the amide in the resin precursor of the comparatively high stereoregular polypropylene alone. The amide then exudes from the base layer through the copolymer film to its surface by "blooming" as is understood by those of skill in the art. Thus, amide additive in the outer film resin starting material is not generally necessary although it may be employed.

The percentage of the amide in the multi-layer structure should be such as to yield a coefficient of friction of the surface of the skin layer of less than about 0.30, preferably less than about 0.25. More particularly, the proportions should be such that the coefficient of friction of the surface of the skin layer or layers is about 0.25 at room temperature and is maintainable at less than 0.8 up to about 200° F.

The amide is preferably dry blended together with the polypropylene resin and then melt mixed. Alternatively, the amide can be incorporated into a minor portion of the polypropylene as a master batch to form a high concentration mix of the amide and the polypropylene. This may then be diluted to the appropriate proportion by the addition of more polypropylene. While the amide is added to the base resin, when the base resin is coextruded with skin polymers some portions of the amide enter into and move to the surface of the skin layer. Thus, by this mechanism-blooming, the amide is available at the surface of the skin layers so as to beneficially effect, in combination with the microcrystalline wax, the coefficient of friction and anti-stick characteristics of the composite film.

The polyolefins of comparatively low stereoregularity contemplated as comprising the skin materials of the multi-layer structures include, for example, random co-polymers of ethylene and propylene and ethylene-propylene-butene-1 terpolymers. Particularly preferred are the ethylene-propylene-butene-1 terpolymers which contain from about 2 to about 7 wt. % and, more preferably, from about 3% to about 5% by weight of ethylene, 2 to 7 wt. %, preferably 3 to about 5% by weight of 1-butene They can have a melt flow rate at 446° F. ranging from about 2 to 15 and preferably 3 to 8. The crystalline melting point is about 251° to 302° F. The number average molecular weight range is from about 25,000 to about 100,000. The density ranges from about 0.89 to 0.90. These terpolymers have excellent heat seal characteristics. They do not, however, have the excellent physical characteristics inherent in the polypropylene of comparatively high stereoregularity. Thus, the base material polypropylene of high stereoregularity possesses the excellent characteristics of good moisture barrier quality, stiffness, high strength and optical properties. While the thin co-extruded surface layers of the comparatively low stereoregular terpolymers provide excellent heat seal characteristics, to take advantage of these characteristics the skin layers must be modified so as to exhibit the characteristics of good slip and the tendency not to stick to an adjacent film region after being exposed to heat-seal temperatures. At the same time it is desired to avoid additions of amounts of additives which lead to non-uniformity and haze.

The overall thickness of the contemplated multi-layer structure is due primarily to the highly stereoregular polypropylene base layer. The coextruded skin layers of comparatively low stereoregularity are present on both surfaces of the base layer. It is preferred that the skin layers have thicknesses of less than about 0.8 microns. So long as the continuity of the film structure is maintained, the minimum thicknesses of the skin layers are not important. Present day techniques will easily permit film thicknesses of about 0.3 or less.

The finely divided anti-blocking agent preferred for inclusion in the heat sealable skin layers may be any particulate inorganic material, preferably having a mean particle size ranging from about 0.5 to 5 microns. One commercially available silica has a mean particle size of 0.75 microns and another has a mean particle size of 4.5 microns. Either material can be employed. Metal silicates, glasses, clays and numerous other finely comminuted inorganic materials may also be used. The anti-blocking agent is preferably present in from about 0.05 to 0.5 wt. %, preferably about 0.1 to 0.3 wt. % of each of the the skin layers.

A key component of the multi-layer film structure is microcrystalline wax. Thus microcrystalline wax is incorporated into each of the heat sealable skin layers to accomplish the beneficial objects of the invention in synergistic combination with the other components. Employment of the wax permits the use of much lower amounts of amide than would otherwise be required and results in superior appearance and physical performance of the films. This is so because the amide contributes to a hazy appearance of those films.

Useful waxes may be any of the known microcrystalline waxes. It is preferred, however, that synthetic n-paraffinic waxes be used. Preferably the wax has a melting point between about 85° C. and about 165° C. The wax is preferably added in amounts between about 5% to about 15% by weight of each of the skin layers and most preferably at about 10%.

A further, preferred, additive for inclusion in the skin layers is glycerol monostearate or other monoglyceride which may preferably be included in amounts between about 0.05 and 0.3% by weight of the layer and most preferably at about 0.1% by weight.

The multi-layer films of the present invention can be prepared employing commercially available systems for coextruding resins. The polypropylene homopolymer of comparatively high stereoregularity containing amide is preferably coextruded with an ethylene-propylene random copolymer of comparatively low stereoregularity containing the appropriate percentage of the combination of wax and optional components such as anti-blocking agent. The polymers can be brought to the molten state and coextruded from a conventional extruder through a flat sheet die, the melt streams being combined in an adapter prior to being extruded from the die. After leaving the die orifice, the multi-layer film structure is chilled and the quenched sheet then preferably reheated and stretched, e.g., 4 to 6 times in the machine direction and subsequently, for example, 4 to 10 times in the transverse direction. The edges of the film can be trimmed and the film wound onto a core. It is preferred that the thus-formed structure be conditioned or equilibrated by holding the same for a period of about 6 hours to 1 week at a temperature from about 80° to about 125° F., especially preferred is a time from about 6 hrs. to about 72 hrs. at between 100°–125° F. This film will have on the surface thereof a combination of the bloomed amide, and wax together with optional components such as anti-blocking agent. The resulting film will have a coefficient of friction of 0.30 or lower, preferably about 0.25 or less, and will not block under conditions of tight winding after being held at temperatures up to 140° F.

Some commercially available base polymers and skin polymers and their at least approximate melting points are tabulated below:

TABLE

| Polymeric Material | | Melting Point Range |
|---|---|---|
| Homopolypropylenes | | 321°–325° F. |
| ARCO W756 | (ethylene-propylene random copolymer 3.3–3.6 wt. % ethylene) | 273° F. |
| ARCO 827 | (ethylene-propylene random copolymer 4–8 wt. % ethylene) | 255° F. |
| Chisso XF 7500 | (ethylene-propylene-butene-1 terpolymer, 3.5 wt. % ethylene, 4.5 wt. % butene-1) | 266° F. |
| Chisso XF 7700 | (ethylene-propylene-butene-1 terpolymer, 5 wt. % ethylene, 4.5 wt. % butene-1) | 250° F. |
| Solvay KS 400 | (ethylene-propylene random copolymer) | 270° F. |
| Solvay KS 409 | (ethylene-propylene random copolymer 3.4–4.0 wt. % ethylene) | 270° F. |
| Sumitomo FL 6711 | (ethylene-propylene random copolymer, 4–6% ethylene) | 255° F. |

Coefficients of friction (COF) or slip may be determined by the "moving slide-stationary film" method of U.S. Pat. No. 3,399,156, incorporated herein by reference.

The contemplated films can be tested by feeding a roll of film into a Mira-Pak vertical form, fill and seal packaging system. This system is equipped with high precision controllers. During transport through the system each bag is subjected to three heat seal regions which can cause package to package stick and drag. The heat seal time is a fraction of a second. The film must maintain a COF at room temperature of between about 0.2–0.3, usually about 0.25 in order to avoid unacceptable drag which would lead to pack jamming and machine down-time. Success of the operation depends on the virtual absence of pack-to-pack stick and drag, a moderate to low force necessary to move the packs through the system and a seal range of at least 40° F., preferably 70°–90° F. on all seal surfaces.

The invention is further elaborated by the following, non-limiting examples.

EXAMPLE 1

A polypropylene homopolymer of comparatively high stereoregularity, i.e. Arco 8670, containing about 750 ppm of erucamide is melted and coextruded with a first skin layer comprising a 50:40 mix of Chisso XF 7700, an ethylene-propylene-butene-1 terpolymer blended with Arco 756, an ethylene-propylene copolymer containing 10 wt % of $B^2195$ microcrystalline wax, 0.15% Kapolite SF anhydrous aluminum silicate antiblocking agent and 0.15% of Myverol 18-06 distilled monoglycerides.

It is also coextruded with a second skin layer of Chisso XF 7700 terpolymer containing 10% of microcrystalline wax, 0.10% erucamide, 0.10% Syloid 245 silica powder, and 0.10% distilled monoglycerides. The coextrudate was then cooled, reheated and stretched biaxially, 4–6 times in the machine direction, and 8–10 times in the transverse direction. The total gauge of the structure was 0.7 mil, the first and second skins comprising 0.03 and 0.06 mil respectively. The room temperature COF was 0.20; the thermal stability of the COF was good, being satisfactory for packaging operations up to 340° F.

EXAMPLE 2

Example 1 was repeated substituting identical skin layers comprising Arco W756 without anti-block or wax, the amide level of the base layer was increased to 1200 ppm. The COF was greater than 0.30. The thermal COF at 160° F. and 4 seconds was poor, greater than 1.0. This is unacceptable for packaging operations.

EXAMPLE 3

Example 2 was repeated but with the addition of 10% $B^2195$ microcrystalline wax to the skin layers. The COF was 0.25 and was good at elevated temperature. Note the improvement of COF and COF thermal stability.

EXAMPLE 4

Example 2 was repeated using XF 7700 terpolymer as the skin layer composition and 900 ppm erucamide in the base layer. The COF was 0.46, too high for satisfactory employment in high speed packaging.

EXAMPLE 5

Example 4 was repeated adding 10% of microcrystalline wax to the skin layers. The COF was 0.19.

What is claimed is:

1. A multi-layer film structure comprising coextruded laminate comprising:
   (a) a base layer comprising polypropylene of comparatively high stereoregularity;
   (b) a first heat sealable skin layer on the base layer comprising
       first polyolefin of comparatively low stereoregularity,
       from about 5% to about 15% by weight of the layer of microcrystalline wax;
   (c) a second heat sealable layer on the base layer comprising
       second polyolefin of comparatively low stereoregularity,
       from about 5% to about 15% by weight of the layer of microcrystalline wax;
   (d) the film structure having included therein an amount of fatty acid amide sufficient to provide said structure with coefficient of friction properties sufficient for high speed heat sealing packaging operations but insufficient to cause substantial hazing of said structure.

2. The structure of claim 1 wherein said polyolefins are either the same or different and are either random copolymers of propylene with ethylene or a terpolymer of propylene with ethylene and butene-1.

3. The structure of claim 2 wherein the copolymer of propylene with ethylene contains from about 2% to about 7% by weight of ethylene.

4. The structure of claim 2 wherein the terpolymer of propylene with ethylene and butene-1 contains from about 2% to about 7% by weight of ethylene and from about 4% to about 5% by weight of butene-1.

5. The structure of claim 1 wherein at least one of the heat sealable layers further comprises finely-divided anti-blocking agent.

6. The structure of claim 5 wherein the anti-blocking agent comprises particulate inorganic material having mean particle sizes from about 0.5 to about 5 microns and is present in amounts of from about 0.05% to about 0.5% by weight of each of the heat sealable layers.

7. The structure of claim 1 wherein the fatty acid amide is present in an amount of from about 0.05% to about 0.20% by weight of the structure.

8. The structure of claim 6 wherein the amide is bloomed onto each of the heat sealing layers from the base layer.

9. The structure of claim 1 wherein the second polyolefin has a melting point sufficiently less than the first polyolefin to cause the second heat sealable layer to exhibit an effective heat sealing temperature at least about 10° F. lower than that of the first heat sealable layer.

10. The structure of claim 1 wherein at least one of the heat sealable layers further comprises monoglyceride.

11. The structure of claim 1 wherein the amide is selected from the group consisting of saturated and unsaturated fatty acid amides.

12. The structure of claim 1 wherein the amide is selected from the group consisting of erucamide, stearamide, behenamide and oleamide.

13. The structure of claim 1 wherein the microcrystalline wax is synthetic n-paraffinic wax having a melting point between about 85 and about 160° C.

14. The structure of claim 1 wherein each of the heat sealable layers is sealable both to itself and to the other of the heat sealable layers.

15. A method for preparing a multi-layer film structure comprising:
melt coextruding a laminar combination of:
a base layer comprising polypropylene of comparatively high stereoregularity;
a first heat sealable skin layer on the base layer comprising
first polyolefin of comparatively low stereoregularity, and
from about 5% to about 15% by weight of the layer of microcrystalline wax; and
a second heat sealable layer on the base layer comprising
second polyolefin of comparatively low stereoregularity, and
from about 5% to about 15% by weight of the layer of microcrystalline wax;
the film structure having included therein an amount of fatty acid amide sufficient to provide said structure with coefficient of friction properties sufficient for high speed heat sealing packaging operations but insufficient to cause substantial hazing of said structure.

16. The method of claim 14 further comprising orienting the structure by stretching the coextrudate in at least one direction.

* * * * *